Patented Nov. 11, 1947

2,430,546

UNITED STATES PATENT OFFICE 2,430,546

BITUMINOUS COATING COMPOSITIONS AND PROCESSES

Robert Jamieson Agnew, Beacon, N. Y., assignor, by mesne assignments, to The Texas Company, New York, N. Y., a corporation of Delaware No Drawing. Application August 15, 1941, Serial No. 407,069

15 Claims. (Cl. 106—269)

My invention relates to bituminous coating compositions of improved adhesive properties, and to an improved method of coating mineral aggregates with bituminous materials to secure better adhesion between the bituminous material and the aggregate.

It is well known that mineral aggregates, and especially those of an igneous or siliceous nature, are difficult to coat with bituminous materials when moisture is present on the surface of the aggregate. Similarly, it is known that in service the bituminous materials tend to strip from the aggregate in the presence of water. In the past a number of expedients, such as the use of adhesion improving agents, have been suggested for overcoming these difficulties, but none of these have been entirely satisfactory from a commercial standpoint. Up to the present time the most satisfactory adhesion improving agents have been combinations of lime and oil-soluble polyvalent metal soaps of high molecular weight acids, such as those disclosed in copending application Serial No. 407,067 by Bruce Weetman, filed August 15, 1941. In the use of such combinations, however, it is necessary to pretreat the aggregate with the lime, before coating with the bituminous material containing the oil-soluble soap. This pretreating of the aggregate is expensive, even in plant mixing operations, and is obviously undesirable for road mixing operations.

I have now found that the lime pretreatment and its attendant disadvantages may be avoided by effecting the coating operation in the presence of an oil-soluble amine. In accordance with my preferred method of operation, both the oil-soluble polyvalent metal soap and the oil-soluble amine are incorporated directly in the bituminous material, which may then be employed to coat aggregates in accordance with any of the conventional procedures. Bituminous coating compositions containing both the amine and the polyvalent metal soap may be used satisfactorily for the coating of wet aggregates, and the resulting coated aggregates will be found to have greatly improved resistance to the stripping action of water.

The adhesive properties of other types of bituminous coating compositions, such as paints, cements, and the like, are also improved by the use of an oil-soluble amine and an oil-soluble polyvalent metal soap of a high molecular weight acid. However, the greatest difficulties in respect to lack of adhesion are encountered in bituminous paving materials for the coating of mineral aggregates, and my invention will be described with particular reference to such compositions.

Any oil-soluble amine may be employed in conjunction with an oil-soluble polyvalent metal soap in carrying out my present invention. I have found that the primary, secondary, and tertiary amines, and substituted amines, such as hydroxyamines, are all suitable for this purpose, and I have successfully used amines of such different chemical structure as mono-amyl amine, tributyl amine, 3-amino-4-heptanol, and 5 - amino-5-ethyl - 2(3-heptyl)-1,3-dioxane. I generally prefer to employ aliphatic amines containing aliphatic groups of 3–7 carbon atoms, and especially the hydroxy substituted amines of this class. Mixed amines may be successfully employed, and materials containing free amines may be used in place of pure amines.

The amount of amine to be used will vary to some extent, depending on the nature of the surface to be coated and the amount of water present on such surface. In the case of paving compositions, more amine is generally required for the successful coating of igneous and siliceous aggregates than is required for coating calcareous aggregates. It is also generally desirable to employ somewhat more amine for the coating of very wet aggregates than is used for coating aggregates which are dry or only slightly moist. Concentrations of amine ranging from 0.1% to 1.5% based on the weight of the bituminous material will usually be found to be satisfactory, and I generally prefer to employ from 0.2% to 1.0% of amine.

The amines may be used in conjunction with any of the oil-soluble polyvalent metal soaps of high molecular weight acids, such as the higher fatty acids, oxidized paraffin wax acids, rosin acids, naphthenic acids, sulfonic acids, and the like. Soaps of acids containing at least 12 carbon atoms are most desirable for this purpose. Any oil-soluble polyvalent metal soap of such acids may be used, as, for example, the lead, zinc, iron, copper, calcium, and aluminum soaps. I generally prefer, however, to use the lead, zinc, and iron soaps, and particularly these soaps of high molecular weight acids derived from the oxidation of petroleum hydrocarbons. Suitable soaps of the latter type are described in copending application Serial No. 407,067, referred to above.

The optimum amount of soap to be employed will vary somewhat with the nature of the surface to be coated and the amount of water present, in the same manner as the optimum amount of amine varies, as pointed out above. Usually, however, from 0.5% to 5.0% of the polyvalent metal soap based on the weight of the bituminous material will be satisfactory, and I generally prefer to use from 1% to 3% of soap.

Both the amine and the polyvalent metal soap are preferably incorporated directly in the bituminous material, and it is by this means that the greatest advantages of my process are secured. However, it is apparent that various modifications of this procedure could be used, as, for example, by precoating with either or both the amine and the soap. For such pretreatment of mineral aggregates, a solvent, such as kerosene or a very light bituminous coating material, could advantageously be employed to secure adequate distribution of the treating agents. Either in such pretreating processes or in employing bituminous material containing both the amine and the soap, standard coating procedures may be employed, and the bitumen may be used in any of the conventional forms, such as molten bitumen, bitumen cut-back with naphtha, and the like.

My invention may be further illustrated by the following specific examples:

Example I

Dry aggregates were mixed with 2% by weight of water, and samples of the resulting wet aggregates were coated with 4% by weight of an asphalt cut-back, comprising 73% of an air-blown asphalt of 65–70 penetration and 27% of 140–400 naphtha distillate. The cut-back had a 122° F. Saybolt furol viscosity of 340 seconds and was applied at a temperature of approximately 120° F. by stirring with the aggregate for one minute.

Additional samples of the moistened aggregates were coated with an asphalt cut-back of the same composition, but containing 0.5% by weight of tri-butyl amine and 2% by weight of an oil-soluble zinc soap of oxidized wax. The soap was prepared from oxidized wax having a saponification number of 194, and containing 33% unsaponifiable matter. This product was made by oxidizing paraffin wax at a temperature of 250° F. with air at a rate of three cubic feet per hour per pound of wax, in the presence of 1% manganese naphthenate as a catalyst.

In each case the percent of the area of the aggregate coated by the bituminous material was visually estimated, after which the coated materials were subjected to a curing period of 48 hours at a temperature of 160° F.

After curing, the coated aggregates were subjected to the Nicholson stripping test (Proceedings of the Association of Asphalt Paving Technologists, Jan. 1932, page 43). This test was modified by adding an additional test period at 140° F. and by estimating the percent of the area of the aggregate exposed by stripping at the end of each test period.

The percent initial coating and the percent stripped after each test period in the stripping test are shown in the table below:

| Aggregate | Asphalt Additives | Per Cent Initial Coating | Per Cent Stripped After Successive Test Periods | | | | |
|---|---|---|---|---|---|---|---|
| | | | 80° F. | 80° F. | 100° F. | 120° F. | 140° F. |
| Trap Rock | No | 45 | 10 | 15 | 25 | 25 | 75 |
| Do | Yes | 85 | 3 | 3 | 8 | 8 | 8 |
| Virginia Granite | No | 85 | 8 | 15 | 25 | 35 | 70 |
| Do | Yes | 95 | 3 | 3 | 3 | 3 | 3 |
| Rhode Island Granite | No | 65 | 15 | 25 | 30 | 45 | 75 |
| Do | Yes | 95 | 3 | 3 | 3 | 25 | 35 |

Example II

The procedure of Example I was followed with the exception that the asphalt cut-back was employed in an amount of 5% by weight of the aggregate and was applied at 75° F. instead of 120° F. In this case 3% of the oxidized wax zinc soap was employed, together with 0.2% of mono-amyl amine, based on the weight of the asphalt cut-back. The percent initial coating and the stripping test results are shown in the table below:

| Aggregate | Asphalt Additives | Per Cent Initial Coating | Per Cent Stripped After Successive Test Periods | | | | |
|---|---|---|---|---|---|---|---|
| | | | 80° F. | 80° F. | 100° F. | 120° F. | 140° F. |
| Connecticut Gravel | No | 45 | 15 | 25 | 30 | 45 | 75 |
| Do | Yes | 85 | 3 | 3 | 8 | 20 | 20 |
| Limestone | No | 45 | 10 | 25 | 30 | 45 | 65 |
| Do | Yes | 85 | 3 | 8 | 10 | 10 | 13 |
| Trap Rock | No | 35 | 5 | 10 | 15 | 20 | 40 |
| Do | Yes | 65 | 3 | 3 | 10 | 10 | 15 |

Example III

The procedure of Example I was followed, using instead of the oxidized wax zinc soap a lead soap of the same oxidized wax, and substituting 0.2% by weight of mono-butyl amine for the 0.5% by weight of tri-butyl amine employed in Example I. The percent initial coating and the stripping test results are shown in the table below:

| Aggregate | Asphalt Additives | Per Cent Initial Coating | Per Cent Stripped After Successive Test Periods | | | | |
|---|---|---|---|---|---|---|---|
| | | | 80° F. | 80° F. | 100° F. | 120° F. | 140° F. |
| Wisconsin Gravel | No | 45 | 33 | 55 | 75 | 90 | 95 |
| Do | Yes | 95 | 10 | 10 | 20 | 33 | 50 |
| Trap Rock | No | 35 | 15 | 20 | 35 | 45 | 70 |
| Do | Yes | 75 | 8 | 8 | 10 | 15 | 15 |
| Dolomite | No | 65 | 5 | 8 | 18 | 25 | 30 |
| Do | Yes | 85 | 3 | 8 | 8 | 3 | 3 |

Example IV

The procedure of Example I was followed, utilizing 2% of oxidized wax lead soap and 0.5% of dibutyl amine. The percent initial coating and stripping test results are shown in the table below:

| Aggregate | Asphalt Additives | Per Cent Initial Coating | Per Cent Stripped After Successive Test Periods | | | | |
|---|---|---|---|---|---|---|---|
| | | | 80° F. | 80° F. | 100° F. | 120° F. | 140° F. |
| Limestone | No | 45 | 35 | 55 | 70 | 78 | 75 |
| Do | Yes | 85 | 3 | 3 | 3 | 5 | 8 |
| Dolomite | No | 65 | 5 | 8 | 18 | 25 | 30 |
| Do | Yes | 85 | 3 | 3 | 3 | 5 | 5 |
| Virginia Granite | No | 90 | 8 | 10 | 30 | 40 | 55 |
| Do | Yes | 98 | 3 | 3 | 5 | 13 | 13 |

Example V

The procedure of Example I was followed, using 3% of oxidized wax zinc soap and 1% of 2-amino-1-butanol. The percent initial coating and the stripping test results are shown in the table below:

| Aggregate | Asphalt Additives | Per Cent Initial Coating | Per Cent Stripped After Successive Test Periods | | | | |
|---|---|---|---|---|---|---|---|
| | | | 80° F. | 80° F. | 100° F. | 120° F. | 140° F. |
| Rhyolite | No | 25 | 20 | 50 | 70 | 80 | 90 |
| Do | Yes | 95 | 3 | 3 | 3 | 3 | 3 |
| Trap Rock | No | 25 | 20 | 30 | 60 | 60 | 80 |
| Do | Yes | 95 | 3 | 3 | 3 | 3 | 3 |

Example VI

The procedure of Example I was followed, using 3% of oxidized wax zinc soap and 1% of 3-amino-4-heptanol. The percent initial coating and the stripping test results are shown in the table below:

| Aggregate | Asphalt Additives | Per Cent Initial Coating | Per Cent Stripped After Successive Test Periods | | | | |
|---|---|---|---|---|---|---|---|
| | | | 80° F. | 80° F. | 100° F. | 120° F. | 140° F. |
| Wisconsin Gravel | No | 25 | 30 | 500 | 70 | 90 | 90 |
| Do | Yes | 100 | 3 | 3 | 3 | 3 | 8 |
| Virginia Granite | No | 85 | 8 | 10 | 30 | 40 | 60 |
| Do | Yes | 100 | 3 | 3 | 3 | 3 | 3 |

Example VII

The procedure of Example I was followed, using 3% of oxidized wax zinc soap and 1% of 5-amino-5-ethyl-2(3-heptyl)-1,3-dioxane. The percent initial coating and the stripping test results are shown in the table below:

| Aggregate | Asphalt Additives | Per Cent Initial Coating | Per Cent Stripped After Successive Test Periods | | | | |
|---|---|---|---|---|---|---|---|
| | | | 80° F. | 80° F. | 100° F. | 120° F. | 140° F. |
| Wisconsin Gravel | No | 25 | 30 | 50 | 70 | 90 | 90 |
| Do | Yes | 100 | 3 | 3 | 10 | 30 | 20 |
| Trap Rock | No | 25 | 20 | 30 | 60 | 60 | 80 |
| Do | Yes | 95 | 3 | 3 | 3 | 3 | 3 |

As may be seen from the above examples, the use of amines in conjunction with polyvalent metal soaps of high molecular weight acids results in very marked improvement both in the initial coating of wet aggregates and in the resistance of the coated aggregates to water stripping. In the coating of dry aggregates, similar improvement in stripping resistance is obtained by the use of these materials, but improvement in initial coating is generally unnecessary in this case.

It is to be understood, of course, that these examples are merely illustrative and do not limit the scope of my invention. I have observed similar improvements in coating and in stripping resistance when coating various other kinds of aggregates and when employing amines and metal soaps other than the specific compounds of the above examples. It is also evident that the use of oil-soluble amines together with oil-soluble polyvalent metal soaps of high molecular weight acids is applicable to improving the adhesive properties of all types of bituminous or asphaltic coating compositions, and is not limited to the paving compositions used to illustrate my invention. It is to be understood that the substitution of other oil-soluble amines and oil-soluble polyvalent metal soaps of high molecular weight acids, and the use of any equivalents and modifications of procedure which would naturally occur to one skilled in the art, are included in the scope of my invention. Only such limitations should be imposed on the scope of my invention as are indicated in the appended claims.

I claim:

1. A bituminous coating composition containing bitumen and 0.1% to 1.5% by weight of an oil-soluble lower amine and 0.5% to 5.0% by weight of an oil-soluble polyvalent metal soap of a high molecular weight acid.

2. An asphaltic coating composition containing asphalt and 0.1% to 1.5% by weight of an oil-soluble lower amine and 0.5% to 5.0% by weight of an oil-soluble polyvalent metal soap of high molecular weight acids derived from the oxidation of petroleum hydrocarbons.

3. A process for coating mineral aggregate which comprises applying to said aggregate a liquid bituminous material in the presence of 0.1% to 1.5% by weight of an oil-soluble lower amine and 0.5% to 5.0% by weight of an oil-soluble polyvalent metal soap of a high molecular weight acid.

4. A process for coating mineral aggregate which comprises applying to said aggregate an asphalt cut-back containing 0.5% to 5% by weight of oil-soluble polyvalent metal soap of a high molecular weight acid and 0.1% to 1.5% by weight of an oil-soluble lower amine.

5. A coated mineral aggregate, comprising crushed mineral matter, the individual pieces of which have a coating of bitumen bonded thereto by 0.5% to 5.0% by weight of an oil-soluble polyvalent metal soap of a high molecular weight acid and 0.1% to 5.0% by weight of an oil-soluble lower amine, said proportions being based upon the bitumen content.

6. An asphatic coating composition comprising an asphalt cut-back, an oil-soluble amine having at least one aliphatic group of 3 to 7 carbon atoms in an amount ranging from 0.1% to 1.5% of the weight of said asphalt cut-back, and an oil-soluble polyvalent metal soap of high molecular weight acids derived from the oxidation of petroleum hydrocarbons in an amount ranging from 0.5% to 5.0% of the weight of said asphalt cut-back.

7. The composition of claim 6 in which the soap is a lead soap of oxidized paraffin wax.

8. The composition of claim 6 in which the soap is a zinc soap of oxidized paraffin wax.

9. A process for coating mineral aggregate which comprises applying to said aggregate a liquid bituminous material in the presence of 0.1% to 1.5% by weight of an oil-soluble amine having at least one aliphatic group of 3 to 7 carbon atoms and 0.5% to 5.0% by weight of an oil-soluble polyvalent metal soap of high molecular weight acids derived from the oxidation of petroleum hydrocarbons.

10. The process of claim 9 in which the soap is a lead soap of oxidized paraffin wax.

11. The process of claim 9 in which the soap is a zinc soap of oxidized paraffin wax.

12. A process adapted for coating damp mineral aggregate which comprises applying to mineral aggregate an asphalt coating composition comprising an asphalt cut-back, an oil-soluble amine having at least one aliphatic group of 3 to 7 carbon atoms, in an amount ranging from 0.1% to 1.5% of the weight of said asphalt cut-back, and an oil-soluble polyvalent metal soap of high molecular weight acids derived from the oxidation of petroleum hydrocarbons in an amount ranging from 0.5% to 5.0% of the weight of said asphalt cut-back.

13. The process of claim 12 in which the soap is a polyvalent metal soap of oxidized paraffin wax acids.

14. The process of claim 12 in which the soap is a lead soap of oxidized paraffin wax.

15. The process of claim 12 in which the soap is a zinc soap of oxidized paraffin wax.

ROBERT JAMIESON AGNEW.

REFERENCES CITED

The following references are of record in the file of this patent:

UNITED STATES PATENTS

| Number | Name | Date |
|---|---|---|
| 2,191,295 | Dohse | Feb. 20, 1940 |
| 2,089,713 | Jan Saal | Aug. 10, 1937 |
| 2,128,523 | Burwell | Aug. 30, 1938 |
| 1,846,107 | Hepburn | Feb. 23, 1932 |
| 2,243,409 | Baldeschwieler | May 27, 1941 |
| 2,317,959 | Johnson | Apr. 27, 1943 |

FOREIGN PATENTS

| Number | Country | Date |
|---|---|---|
| 355,937 | Great Britain | 1931 |
| 429,548 | Great Britain | 1935 |
| 519,119 | Great Britain | Mar. 18, 1940 |
| 848,911 | France | Aug. 7, 1939 |
| 847,829 | France | July 10, 1939 |